United States Patent [19]

Erickson

[11] Patent Number: 4,830,112

[45] Date of Patent: May 16, 1989

[54] METHOD AND APPARATUS FOR TREATING WELLBORES

[76] Inventor: Don J. Erickson, P.O. Box 1285, Fort Stockton, Tex. 79735

[21] Appl. No.: 132,764

[22] Filed: Dec. 14, 1987

[51] Int. Cl.$^4$ ........................ E21B 37/06; E21B 43/00
[52] U.S. Cl. ................................... 166/304; 166/312; 166/53; 166/902
[58] Field of Search ................. 166/53, 54, 64, 75.1, 166/250, 279, 304, 310, 312, 902

[56] References Cited

U.S. PATENT DOCUMENTS

| | | | |
|---|---|---|---|
| Re. 32,304 | 12/1986 | Maxwell | 166/53 |
| 2,884,067 | 4/1959 | Marken | 166/75 |
| 3,171,485 | 3/1965 | White, Jr. | 166/64 |
| 3,211,225 | 10/1965 | Thiessen et al. | 166/75 |
| 3,228,472 | 1/1966 | Rhoads, Jr. | 166/902 X |
| 3,242,990 | 3/1966 | Keaton, Jr. | 166/54 |
| 3,710,867 | 1/1971 | Bansbach | 166/902 X |
| 4,354,553 | 10/1982 | Hensley | 166/244 |
| 4,436,148 | 3/1984 | Maxwell | 166/64 X |
| 4,635,723 | 1/1987 | Spivey | 166/250 |
| 4,681,167 | 7/1987 | Soderberg | 166/304 X |

Primary Examiner—William P. Neuder
Attorney, Agent, or Firm—Marcus L. Bates

[57] ABSTRACT

A method and apparatus of chemically inhibiting corrosion of a borehole and connected flowlines. A mixing tank receives flow from the chemical pump. The mixing device is connected to the borehole. A timer device operates to allow sequential flow to the mixing tank. The treatment fluid admixes with the formation fluid downhole.

22 Claims, 3 Drawing Sheets

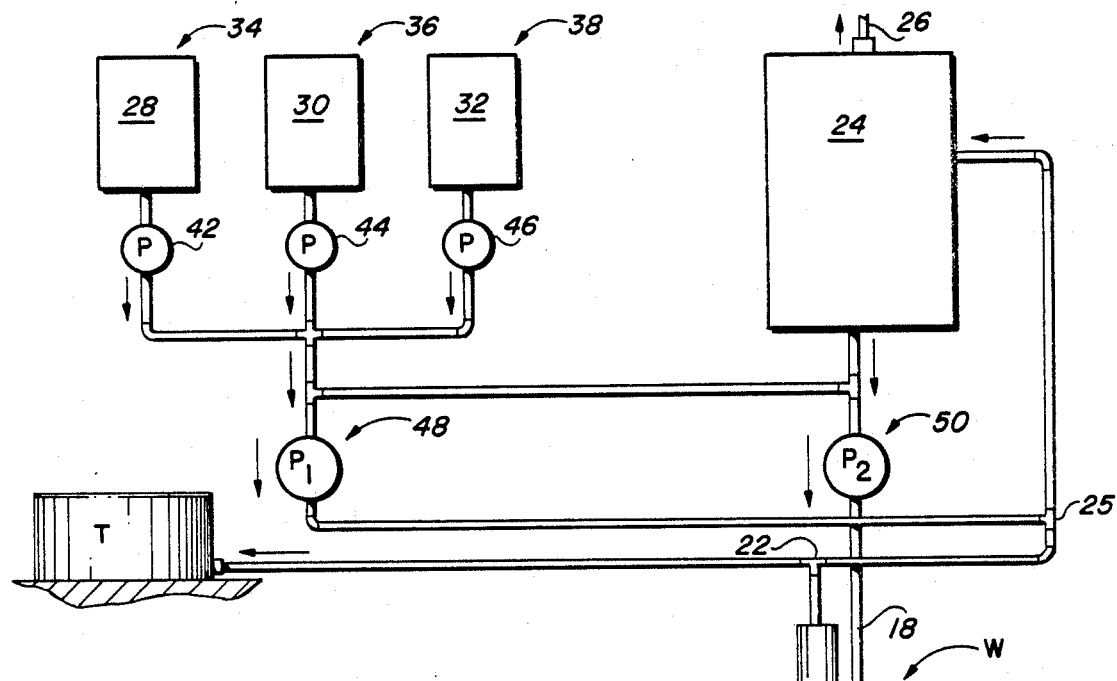
FIG. 2
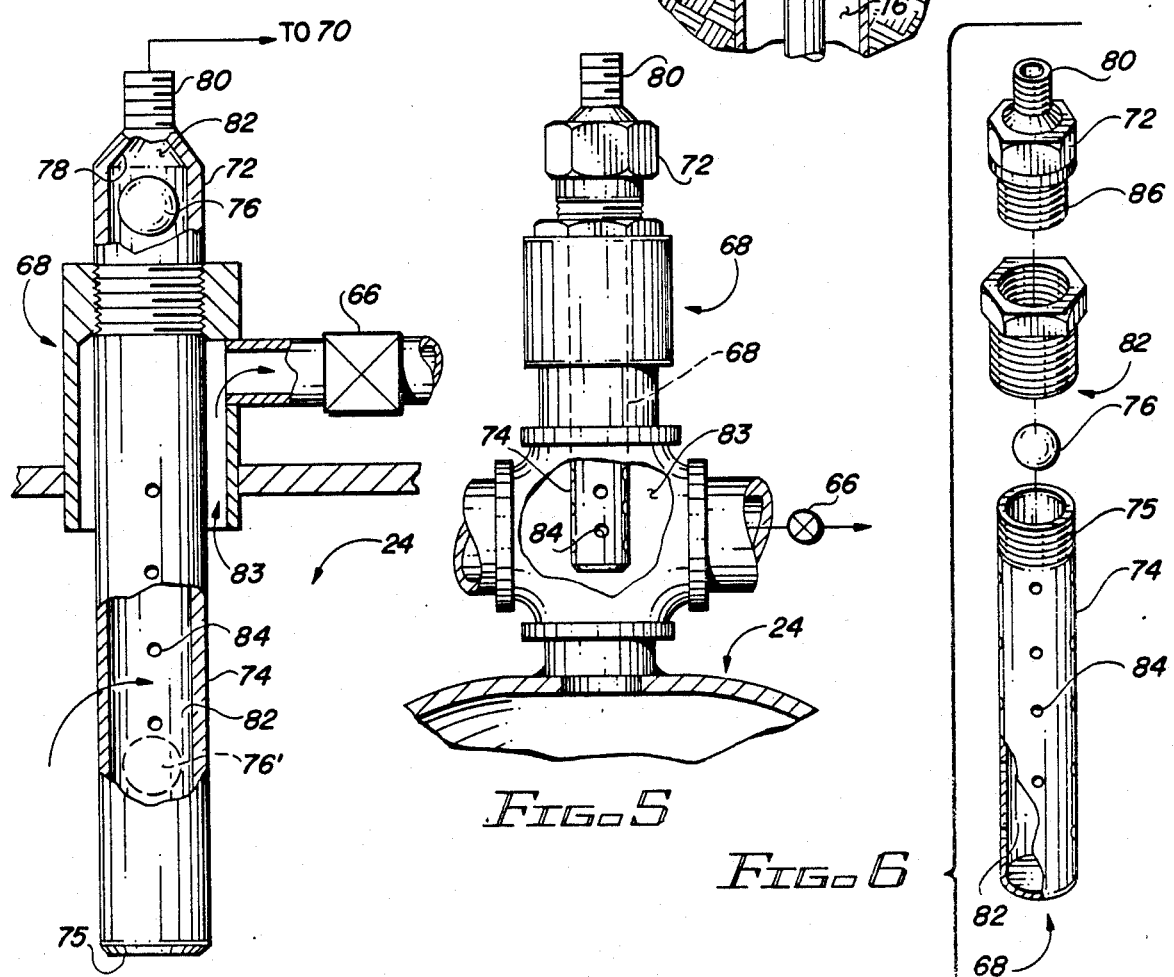
FIG. 4
FIG. 5
FIG. 6

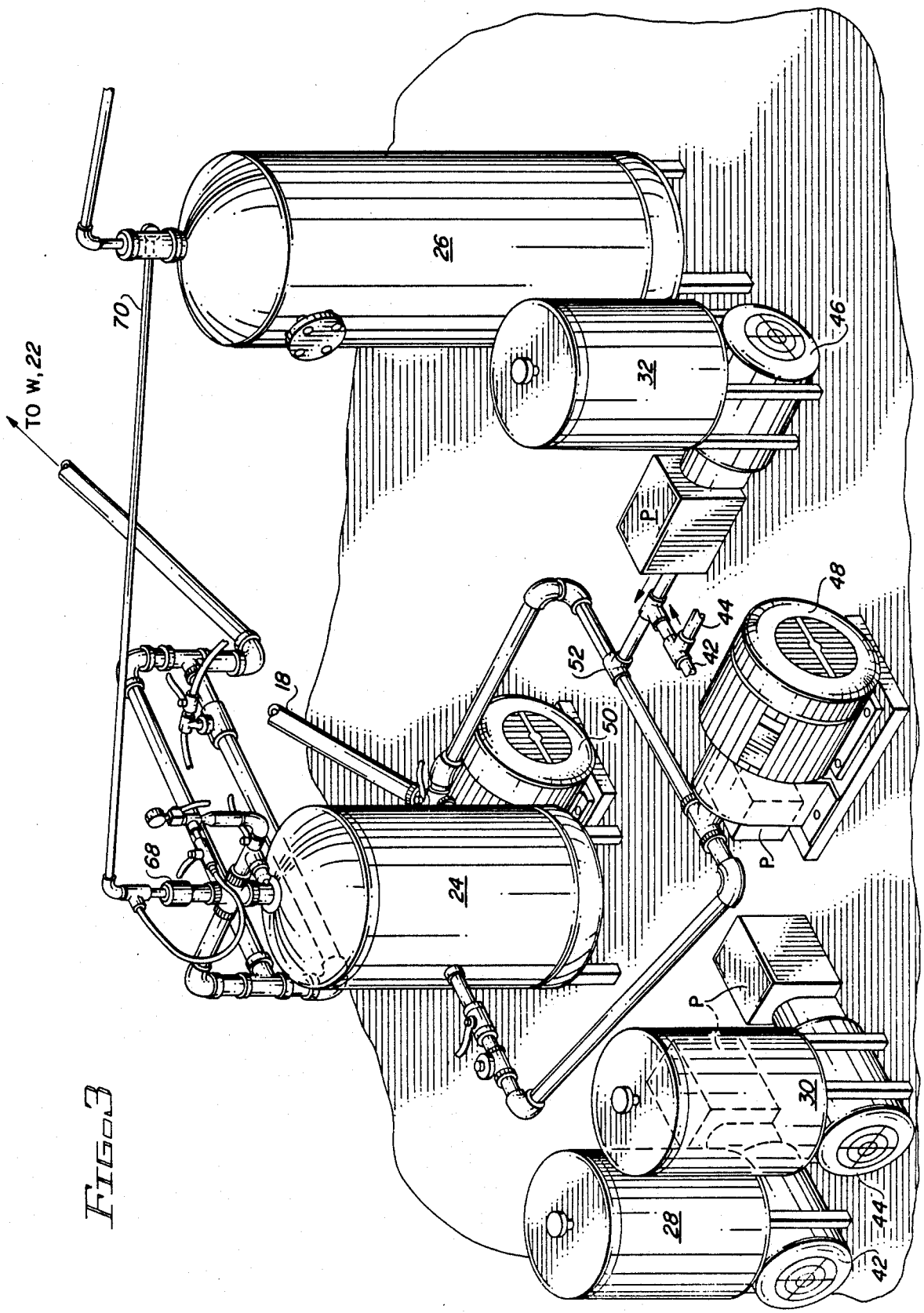

METHOD AND APPARATUS FOR TREATING WELLBORES

BACKGROUND OF THE DISCLOSURE

There are almost as many oil wells in some geographical locations as there are people. Some of these wells are free flowing with an envious production rate and usually quite valuable because they make a lot more money than it costs to operate the well. There are other oil wells that show a marginal profit due to the low production rate and the costly upkeep, and often at the end of the month a loss is sustained rather than the desired profit, because it has cost more to operate the well than the money received from selling the produced oil. For example, Fort Stockton, Tex., is located in the Chihuahuaian desert, and has numerous hydrocarbon producing wells such as described above. Many of these marginal wells are owned by individuals who personally operate and maintain the wells, as contrasted to the more profitable wells which usually are owned by the large oil companies. An individual owner-operator can often operate a well at a profit whereas the same well, if operated by a large company, will probably show a loss. Large companies usually will not operate a well at a loss unless ulterior motives are involved.

These marginal wells often require a pumpjack unit to lift the crude to the surface of the earth, which increases the cost of operation. The produced fluid is sometime very corrosive and this causes everything contacted by the fluid to rapidly deteriorate. This deterioration causes holes to appear in the tubing, the rod string to deteriorate and break, as well as malfunction of the downhole pump, and many other problems that can be associated with scale and other debris that results from the downhole corrosion that is going on all the time unless something is done to counteract this expensive, deleterious, and undesirable destruction.

Whenever these downhole problems interrupt the production it is necessary to call out an expensive pulling unit or workover rig and pull whatever is defective from the borehole. Sometime this includes thousands of feet of the rod string and the tubing string in order to retrieve the downhole pump or to replace the tubing string.

It would therefore be desirable to be able to chemically inhibit the entire borehole and flow lines connected thereto in a manner which would reduce the rate of corrosion to an acceptable value by the employment of appropriate treatment chemicals. It would also be desirable to be able to treat the well with various different treatment chemicals in a manner to assure that all of the metal parts of the equipment associated with the wellbore are properly coated, and thereby reduce the rate of corrosion to an acceptable value; as well as modifying the properties of the produced fluid and additionally preventing various other undesirable phenomena from occurring downhole in the borehole so that a marginal producer can be changed into a profitable operation.

Those skilled in the art of selling treatment chemicals for use downhole in a borehole have come up with dozens of different organic and inorganic chemicals that need to be considered for treatment of a borehole. Therefore, it is often desirable to treat a borehole with a plurality of different chemicals in order to achieve all of the above desirable protective expedients. However, when a plurality of chemicals are mixed together and stored for a long period of time, in some instances many of the beneficial characteristics of the chemical mixture is lost due to complex interaction that occurs amongst the different treatment compounds. On the other hand, even when these chemicals are maintained separate from one another until they are individually injected into the upper borehole annulus, they commence free falling down through the annulus and soon contact and cling to the interior surface of the casing wall and the exterior surface of the tubing wall where they can subsequently react with the sour gas, one another, and any other available reactant that may be present since they are exposed and coat a tremendous surface area. Moreover, it is only natural that an undesirably long time interval is involved before the treatment chemical reaches the downhole pump and formation. Most anything can happen to the chemical during this long interval of time.

The treatment of a marginal producer must therefore be judiciously planned and carefully carried out or there will still remain a lack of profit because it will now be shared between the pulling unit company and the chemical company, rather than accumulating to the benefit of the owner.

It would therefore be desirable to be able to treat a hydrocarbon producing well in a manner whereby low cost chemical treatment can be carried out in a dependable and economical manner, and with an efficiency which causes the well to produce for many months without any maintenance required on the well, and wherein the cost of treating the well becomes economically tolerable, whereby the sales of the crude produced by the well leaves a profit at the end of the month after the maintenance and chemical bills have been paid.

A method and apparatus for downhole chemical treatment of a wellbore which achieves the above desirable goal is the subject of the present invention.

SUMMARY OF THE INVENTION

A wellbore has a casing extending downhole to a production formation, and a tubing string extending back uphole through which produced fluid from the formation is conducted. The upper end of the tubing is connected so that the produced fluid flows to a stock tank in the usual manner. The well is treated in a novel manner according to the present invention by transferring a predetermined quantity of a plurality of chemicals into the wellbore in a quantity that coats both the casing and tubing, thereby chemically inhibiting or treating all of the surfaces associated with the well bore, including the casing interior, any downhole pump that may be present, along with a sucker rod string, and any above ground piping and other flow related equipment.

This method of the present invention is carried out by the provision of a large mixing tank connected to receive flow from a plurality of chemical pump means. The flow from several of the pump means is connected to the suction of a mixing pump. A plurality of storage containers each contain a selected chemical to be subsequently transferred into the borehole at a predetermined rate of flow. The mixing tank is connected to receive produced fluid flowing from the borehole so that the mixing tank is either full of produced liquid, or is about to be filled with produced fluid. The mixing pump is connected to mix the contents of the mixing tank in unison with the energization of the chemical pump motors.

A first timer device simultaneously connects the mixing pump motor and the motors for the plurality of chemical pumps to a source of current so that the chemical delivery pumps and mixing pump simultaneously start and run for a first time interval during a predetermined second time interval. For example, each fifteen minutes (the second time interval) the chemical pump and mixing pump are turned on for four minutes (the first time interval). This causes the contents of the large mixing tank to sequentially receive flow from the chemical delivery pumps and thereby progressively become more concentrated with the treatment chemical. This also assures that the various liquids are admixed and uniformly dispersed throughout the large mixing tank.

A delivery pump is connected between the upper end of the borehole annulus and the mixing tank, and at predetermined intervals of time (the third time interval) the delivery pump is turned on, thereby transferring the entire contents of the mixing tank into the upper borehole annulus. For example, the delivery pump is turned on for approximately 2 minutes (a fourth time interval) each two hours (third time interval) and rapidly transfers the entire contents of the mixing tank into the upper borehole annulus so that the mixing tank is quickly emptied and must therefore again be filled with produced fluid and treatment chemical in the above described manner.

The mixing tank, when filled with produced fluid and treatment fluid, contains approximately forty gallons of liquid. This liquid is cyclically rapidly transported by the delivery pump into the upper end of the borehole annulus, whereupon the large quantity of liquid admixed with treatment chemical is dispersed so that it flushes or runs down the interior of the casing wall and the exterior of the production tubing wall, thereby washing and coating the entire metallic surfaces of the wellbore as it falls as a dense rain all the way down to the fluid level at the bottom of the borehole, where it admixes with the formation fluid. Any tubing hangers, centralizers, and other downhole devices are similarly treated by the deluge of chemical as it falls by gravity with a reflux action towards the bottom of the borehole where it admixes with and becomes part of the formation fluid.

The fluid from the production formation flows through the perforations of the casing and into the bottom of the borehole where the formation fluid covers the downhole pump intake. The descending treatment fluid that free fell all the way down the borehole annulus immediately admixes with the upper strata of the formation fluid, while the treatment fluid that has washed the surfaces of the upper borehole annulus continue to drain by gravity down towards the formation fluid level contained in the lower annulus. Hence the upper strata of the formation fluid is now progressively admixed with the treatment fluid, and accordingly continually admixes with the formation fluid entering the well bore through the perforations. Accordingly, the mixture of formation fluid and treatment fluid continually enters the pump intake where it treats the interior of the pump, the tubing string, the rod string, and the outflow lines leading back up to the tank battery.

The concentration of the treatment chemical entering the pump suction will vary from a maximum to a minimum value depending upon the cycle or time interval as well as the rate of flow of the treatment chemical into the mixing tank. By separating the different treatment chemicals until immediately before the chemicals are translocated into the borehole preserves the original characteristics of the various different treatment chemicals so that they each have their designed affect upon the wellbore and the apparatus contained therewithin.

It is therefore a primary object of the present invention to provide an improved method and apparatus by which a hydrocarbon producing wellbore can be treated.

Another object of the invention is to provide a method of treating a wellbore with a plurality of chemicals by individually mixing the chemicals with a diluent, within a first predetermined time interval, and injecting the diluted chemicals into a wellbore during a second time interval.

A further object of this invention is the provision of an apparatus for mixing a plurality of chemicals together and translocating the chemicals into a wellbore in a manner which renders the chemicals more effective than has heretofore been realized.

A still further object of this invention is the provision of a process for treatment of a wellbore comprising mixing a plurality of individual treatment chemicals with a compatible diluent and transferring the mixture into the upper end of a wellbore at predetermined intervals of time causing the mixture to flood the borehole and fall by gravity and then admix with the downhole fluids so that as the well is produced, the entire surface area of the well is subjected to chemical treatment.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

BRIEF DESCRIPTION OF THE DRAWINGS

FIG. 2 is a simplified flow sheet that diagrammatically sets forth a preferred form of the present invention;

FIG. 3 is a perspective view of apparatus made in accordance with one form of the present invention;

FIG. 4 is a fragmentary, enlarged, part cross-sectional view of part of the apparatus disclosed in FIG. 3;

FIG. 5 is a fragmentary, part cross-sectional view of an alternate embodiment of the apparatus disclosed in FIG. 4; and FIG. 6 is an exploded view of part of the apparatus disclosed in FIG. 5.

DETAILED DESCRIPTION OF THE PREFERRED EMBODIMENTS

Figure 1:
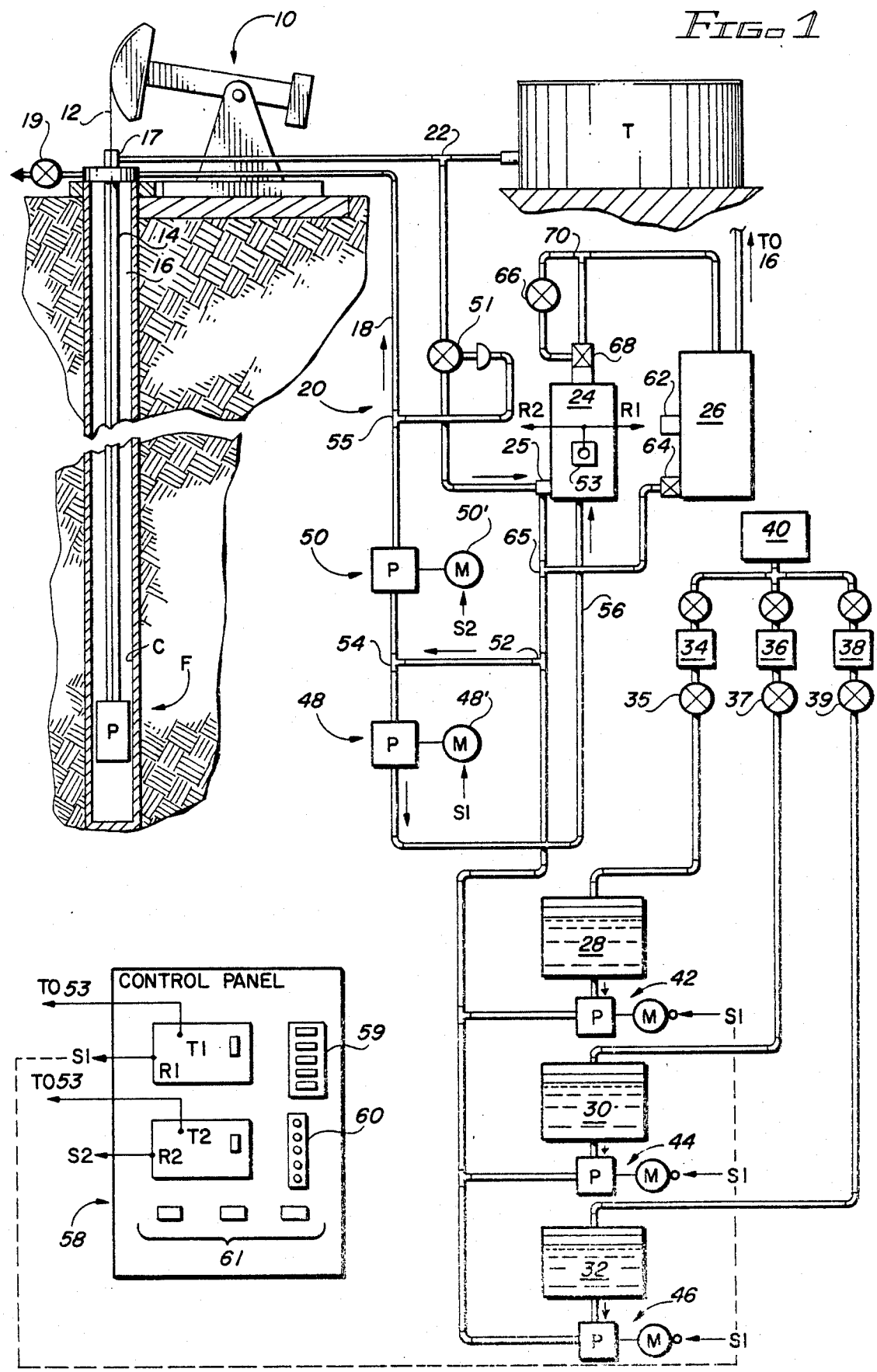
FIG. 1 is a flow sheet that diagrammatically discloses a process by which a wellbore can be treated in accordance with the present invention.

In FIG. 1 of the drawings, there is disclosed a pump-jack unit 10 connected to reciprocate a sucker rod string 12 that extends concentrically down through a tubing string 14 to a downhole pump P. The pump is located thousands of feet downhole in the illustrated borehole where it is positioned adjacent to a hydrocarbon producing formation F. The borehole is cased in the usual manner as noted at C and thereby forms the annulus 16 located between the casing and the tubing. A conventional stuffing box 17 reciprocatingly receives the usual polish rod located at the upper end of the rod string 12.

Piping 18 communicates with borehole annulus 16. Valve 19 is connected to annulus 16 for removing compressible fluids, such as gaseous hydrocarbons, from the annulus.

The arrow at numeral 20 broadly indicates part of the process that is carried out according to the method of the present invention. The produced fluid from the downhole pump P flows up the tubing string 14 and through tee 22 before entering storage tank T. The tee 22 is connected to an inlet of a large mixing tank 24. The mixing tank preferable is approximately 40-50 gallons capacity depending upon the surface area of annulus 16 to be treated along with the production rate of downhole pump P. Numeral 25 indicates a flow connection into tank 24. An overflow tank 26 is connected into the system. The overflow tank 26 has a capacity of 50-80 gallons.

Containers 28, 30 and 32 each contain treatment chemical therein for use in treating the illustrated borehole in accordance with the present invention. Numerals 34, 36, and 38 schematically illustrate chemical storage vessels that are connected to containers 28, 30, 32 by means of valves 35, 37, 39. Numeral 40 indicates a 55 gal drum for containing a cutting agent, such as kerosene, or any other common treatment chemical that is compatible with and can be admixed with the chemical that is contained within the treatment chemical containers 34, 36, 38 by use of the illustrated valves connected thereto.

Each of the chemical dispensing containers 28, 30, 32 respectively, have a pump and motor 42, 44, 46, respectively, connected thereto and to a source of current S1 by which each of the motors are energized, thereby driving the attendant pumps. A large volume mixing pump 48, preferably a motor driven gear pump that moves about 20 gallons of fluid per minute, also has the motor thereof connected to a source S1 of current. The mixing pump 48 mixes the contents of mixing tank 24, as illustrated in the drawings, and as will be more fully described later on herein.

Delivery pump assembly 50 is connected to rapidly translocate the contents of mixing tank 24 into the upper end of annulus 16. The motor 52 that drives the pump P of the delivery pump assembly 50 is connected to a source S2 of current. The pump assembly 50 preferably is sized to deliver the contents of the mixing vessel into the borehole annulus in a time interval of about two minutes and therefore is a 20 gpm pump that has a discharge pressure of about 60 psig.

The pump P of each of the pump and motor assemblies 42, 44, 46 is connected to tee 52 located at suction side 54 of the mixing pump 48. Numeral 56 indicates a flow conduit by which the discharge of the mixing pump 48 returns fluid into mixing chamber 24 as the contents of chamber 24 flow from connection 25, tee 52, tee 54, along flow conduit 56, and back into the tank 24 while the gear pump 48 intimately mixes and emulsifies the entire contents of container 24. A motor valve 51 is connected to be closed whenever fluid flows through conduit 18 from mixing tank 24.

In FIG. 1, numeral 58 indicates a control panel that can be conveniently located most anywhere respective to the wellhead and to the other apparatus of the present invention. The panel 58 includes a first relay R1 connected to timer means T1 for providing a source of current S1 to each of the motors at 42, 44, 46 and 48 so that during each second time interval, a fifteen minute interval of time, for example, S1 energizes the four motors 42-48 for a smaller first interval of time, four minutes for example.

R2 indicates a relay connected to timer means T2 and arranged to provide a source of current S2 for the motor of pump assembly 50 so that the motor is energized for a specific length of time (a fourth time interval) during each successive selected third time interval. For example timer T2 operates to energize relay R2 to connect motor M of pump assembly 50 to a source of current each two hours, with the motor running for approximately a two minute interval of time during this two and one half hour time interval, assuring that the transfer pump P has transferred the entire contents of container 24 rapidly into the upper casing annulus 16. Numeral 53 is a float control valve located on mixing tank 24 that de-energizes transfer pump assembly 50 when the fluid level in the mixing tank is low.

Numeral 59 indicates individual switches for the motor of pump assembly 42, 44, 46, 48, 50. Numeral 60 is illustrative of a bank of lights, each of which are illuminated when the appropriate before described motors are energized. Numeral 61 is a mechanical disconnect by which all of the circuitry of the system 20 is disconnected from the main. Where deemed desirable the pumpjack control can be incorporated into the panel 58 by an additional relay that is connected back to the starter control of the pumpjack motor.

In FIG. 1 the overflow tank 26 includes a float 62 that actuates a valve device at outlet 64. Whenever the contents of tank 26 reaches a predetermined level, the valve 64 is opened and thereby connected to the suction of delivery pump 50. The float is set to prevent the overflow tank from exceeding 50% capacity.

Numeral 66 indicates a pressure control bypass by which liquid is transferred from mixing container 24 into overflow tank 26 when the set pressure (20 psi) of the relief valve 66 is exceeded. Numeral 68 indicates a novel check valve assembly that has a floating ball element arranged therein and exhausts compressible fluid from chamber 24 into chamber 26. The combination of the liquid relief valve 66 and compressible fluid relief valve 68 cooperate with mixing chamber 24 in an unusual and novel manner, and enable the process of the present invention to be carried out efficiently and reliably. The details of the compressible fluid relief valve 68 is schematically shown in FIG. 4, while FIGS. 5 and 6 illustrate in greater detail one of the preferred embodiments thereof.

As seen illustrated in FIG. 4, the apparatus 68 includes a valve seat assembly 72 connected to a lower cylindrical perforated cage 74 having a diameter approximately equal to the diameter of a ball 76. The ball 76 is of a size to freely move from the interior of the lower end 75 of the perforated cage 74 up into abutment with seat 78 of the valve seat assembly 72. The ball 76 is made of an elastomeric substance which floats in the mixture contained within mixing chamber 24 so that as the mixture fills the interior 82 of the relief valve 68, the ball 76 will float up into engagement with seat 78 thereby causing all of the compressible fluids to be expelled from the upper end 80 of the chamber 24. The ball 76 preferably is a commercially available ball sealer injector ball used in acidizing and fracturing boreholes.

Numeral 83 indicates an annular area to which the before described relief valve 66 is connected. Accordingly, compressible fluid is exhausted from container 24 through relief valve 68 any time the container is not filled with liquid, while liquid is exhausted from mixing chamber 24 through relief valve 66 only when a predetermined elevated pressure is exceeded. This unusual combination always assures that chemical can be received within the mixing tank at any time.

The operation of the invention will be explained in conjunction with a pumpjack operated downhole pump assembly, with it being understood that other known type pumps as well as a free flowing well can be chemically treated according to the method and apparatus of the present invention.

In FIG. 1, the pumpjack unit 10 often has a pump-off control assembly associated therewith so that the operation of the pump is carried out at unpredictable intervals of time, depending upon the production characteristics of the downhole formation F, the size of the downhole pump P, and the strokes per minute of the rod string 12. Nevertheless, pumpjack assembly 10 usually will produce several barrels of fluid several times per hour, with the fluid flowing through tee 22 into tank T.

As fluid flows toward tank T, liquid is made available to mixing chamber 24, when valve 51 is open. If mixing chamber 24 is full, no fluid will flow from tee 22 into connection 25. If the container 24 is not full, and valve 51 is open, then fluid will flow from tee 22, through motor valve 51, and into mixing chamber 24 because the pressure differential across the mixing tank is of a small value compared to the pressure at 22, noting that the gas exhaust valve 68 is open at this time.

In order to completely fill chamber 24, compressible fluids must be exhausted through valve device 68, tee 70, and into the overflow tank 26. In order for overflow tank 26 to be at a low pressure so that it can accommodate the compressible fluids from 68, it is connected either to atmosphere or back into the well casing. Preferably it is connected back to the well casing in order to provide a closed system that precludes the entire process of the present invention from contaminating either the surrounding soil or the atmosphere, and this unusual system provides one of the novel and unexpected results of the present invention.

Therefore, the pumpjack unit 10 produces the wellbore independently of the process 20 of the present invention, while the process 20 treats the wellbore independently of the pumpjack unit 10. Once each month or so, treatment chemical is stored in the individual containers 34, 36, 38; while a cutting fluid 40, such as kerosene, is admixed with each of the chemicals 34, 36, 38 to provide for the proper viscosity of the individual treatment chemicals, to increase the volume of the metered chemical so that a small quantity rather than a minute quantity of chemical is measured and pumped by the system, and further to provide a compatible and inexpensive additional treatment chemical in the form of the low cost, readily available kerosene stored at 40. Varying amounts of the cutting fluid (kerosene) are transferred into each of the make-up containers.

The chemical is transferred from make-up containers 34, 36, 38, respectively, into the fiberglass dispensing containers 28, 30, 32, respectively, by means of transfer valves 35, 37 39, respectively. Accordingly, one can visually observe the liquid level in the fiberglass dispensing containers 28, 30, 32 and add make-up chemical thereto as may be required. Over a long period of time, the exact amount of cutting fluid 40 along with the rate of delivery of the pumps at 42, 44, 46 will be "fine tuned" whereby the contents of the containers 28, 30, 32 will be more uniformly consumed by the process; i.e.; simultaneously emptied.

The pump speed and pump stroke of the illustrated dispensing pumps 42, 44, 46 therefore is adjusted to provide the desired concentration of chemicals 34, 36, 38 transferred each second time interval into mixing chamber 24 each cycle of operation, which is the before described third time interval.

Timer T1 is set to trip relay R1 to provide a source of current S1 for a four minute run time each fifteen minute interval of time. Stated differently, pumps 42, 44, 46 and 48 are turned on for four minutes and then are de-energized for eleven minutes each twenty-four hours of the day. This timed cycle of operation sequentially transfers a finite amount of treatment chemical from containers 28, 30, 32 into the large mixing chamber 24.

The transfer of chemical into the mixing chamber occurs in this described manner regardless of whether the delivery pump 50 is dumping the contents of container 24 into the annulus 16, or whether flow is occurring from tee 22 into the mixing chamber 24, or whether the mixing chamber 24 is completely full or empty. In either instance, the borehole will be properly treated in accordance with the present invention. In the first instance, where the delivery pump 50 has been actuated by timer T2 and is running, the simultaneous delivery of chemical at tee 52 by pumps 42–46 will coincide with the delivery of the contents of the mixing chamber 24 into the annulus by the delivery pump 50 which is a perfectly acceptable situation.

The valve 51 connecting tee 22 to connection 25 of the mixing chamber is closed to flow therethrough whenever the large mixing chamber is dumping. This is achieved by the illustrated motor valve 51 which is closed in response to flow occurring at the discharge of transfer pump 50, that is, through tee 55. A less desirable arrangement that can be employed in order to eliminate the motor valve 51 is to precisely size the flow line leading from tee 22 to the large mixing chamber so that the chamber 24 requires approximately ten minutes to be filled while pumpjack 10 is operating. During this time interval it is necessary for the compressible fluid relief valve 68 to be opened so that gaseous fluid is exhausted into overflow tank 26. Further, during this time it is acceptable for the pumps 42, 44, 46 to be delivering chemical into connection 25 while simultaneously receiving produced fluid from tee 22. In this embodiment, additional time is required for the pump 50 to empty mixing chamber 24, and it would, of course, be essential for the rate of delivery of pump 50 to greatly exceed the flow from tee 22 into connection 25.

Usually, however, the mixing tank 24 will have been filled with production fluid from tee 22 when the pumps 42, 44, 46, 48 are turned on for their four minute run interval. During this run time, the gear pump at 48 mixes the contents of the mixing tank with great force while chemical from containers 28, 30, 32 is received at pump suction 32. However, the mixing chamber 24, already being full of incompressible fluid, must have a quantity of liquid removed therefrom equal to the charge of treatment chemical that is delivered jointly by the pumps 42, 44, 46. This is achieved by the relief valve 66, which is set to open at a pressure lower than the pressure provided by the pumps 42, 44, 46. The displaced liquid flows from chamber 24, through relief valve 66, and into the overflow tank 26.

The overflow tank 26 preferably is 60–100 gallon capacity and the contents thereof is dumped back into the wellbore casing whenever it is about half full. This is achieved by a float actuated valve device, which includes a float 62 connected to open valve 64, whereupon the contents of container 26 is transferred to the annulus by delivery pump 50 on the next cycle of operation. This unusual arrangement saves the accumulated produced fluid along with a small amount of accumulated treatment chemical, all of which is desirable to be re-introduced into the borehole in this novel manner, and to provide the closed treatment system of this invention.

FIG. 2 is a simplified illustration of the process carried out by the present invention. In FIG. 2, the chemical containers 28, 30, 32 are charged with the desired concentration of the treatment chemicals from vessels 34, 36, 38 (FIG. 1) to thereby provide a sufficient quantity of chemical for treating the well over a long period of time, for example several weeks. There can be one chemical as indicated at 28 or a plurality of treatment chemicals as shown that includes containers 28, 30, 32, as well as additional containers of chemical arranged in the manner set forth herein. It is desirable to transfer a finite amount of the chemical from each of the vessels 28, 30, 32 into the mixing chamber 24 where the chemical is thoroughly mixed at 48 and then dumped at 50 through conduit 18 into the wellbore annulus 16 in as short a time as reasonably possible. The dumping should occur in a manner that causes the mixture of chemicals to be evenly distributed around the upper end the annulus to thereby evenly disperse and retard the rate at which the liquid falls downhole. The dumped chemical effectively washes the entire surface of the tubing and casing as it gravitates toward the bottom of the borehole. For example, a number of nozzles radially spaced and aligned with the annulus will suitably achieve this purpose.

In FIG. 2, production from tubing string 14 flows through tee 22 into stock tank T. At the same time, production fluid is connected to flow at 25 into mixing tank 24. Pump P1 thoroughly mixes the contents of mixing tank 24. The contents of the mixing tank is transferred by means of delivery pump P2 into the annulus of the borehole in the before described manner. The pumps at 42, 44, 46, 48 are energized for four minutes, for example, during each fifteen minute time interval. The pump 50 transfers the contents of the mixing tank 24 into the annulus each two hours. Accordingly, treatment chemicals are continuously added to the container 24 and agitated about ten times during each time interval before the mixture of chemicals is dumped by the transfer pump 50. The quantity of the chemical that accumulates during this two and one half hour interval is progressively increased to a desired concentration. This value is analytically predetermined so that during each cycle of the process, the appropriate amount of chemical can be metered at 42, 44, 46. Moreover, this two hour time period between dumping is selected by studying samples taken at tee 22 over a long period of time, thereby providing data related to maximum and minimum concentration of the desired chemicals during one cycle of operation of the system.

Accordingly, the selection of the chemical at 34, 36, and 38; the concentration of the chemical at 28, 30, 32; the rate delivery of the chemical by the pumps at 42, 44, 46; and the interval of dumping the mixing tank 24 into the annulus 16 must all be taken into consideration and adjusted to provide the appropriate and proper degree of well treatment desired.

The present invention provides a process for treating a hydrocarbon producing wellbore that is reliable and can be left unattended for weeks at a time. The apparatus is skid mounted as seen in FIG. 3 and easily transported to a production site and attached into existing connections associated with the wellhead and production lines. The quantity of chemical delivered from each of the containers 28, 30, 32 is easily selected by adjusting the stroke and displacement of the pump associated therewith. The treatment is best selected by considering the chemical composition of the produced fluids together with historical data concerning the rate of corrosion of the downhole pump and tubing, as well as other considerations such as paraffin, salt water, hydrogen sulfide, oil, gas, water ratio, depth of the well, surface area to be treated, and the rate of production.

In one specific process carried out on a 2700 foot well located in Fort Stockton, Tex., the well, prior to being treated according to the present invention, had previously developed problems on approximately a thirty day cycle which often required the services of a pulling unit. The well was continuously treated according to the process of the present invention and after the well stabilized, only routine maintance was required for almost a year. The well had a production rate of 30 BPD total fluid and the following specific chemical treatment was carried out:

The kerosene stored in a drum at 40 was admixed with clean, pure water and a treatment chemical to provide a mixture at 34, 36, and 38 as follows:

The resultant mixture contained within container 34 was 20% Quaker Petroleum Chemical #5656, 40% kerosene, 40% water. The emulsifying agent contained in the QPC #5656 enabled the contents to be suitably admixed to achieve a uniform mixture of treatment chemical.

The resultant mixture contained within container 36 was 20% Quaker Petroleum Chemical #5610, 40% kerosene, and 40% water, similarly admixed together.

The chemical contained within vessel 38 was 20% Aqua Mate #2, 40% water, and 40% kerosene admixed with one another in the above described manner.

The above treatment chemicals are available from The Quaker State Petroleum Chemical Co. of Odessa, Tex. During each 15 minute interval the chemical pumps transferred sufficient chemical into mixing chamber 24 to provide a flow of four gallons of the mixture from each of the containers 28, 30, 32 into the borehole each day. The transfer pump 50 was energized each 3 hours to dump the contents of the mixing container into the borehole in a 12 minute time interval. This cycle of operation was carried out on a 24 hour schedule and was interrupted only when it was necessary to service the equipment.

I claim:

1. In a cased wellbore extending downhole through a hydrocarbon producing formation, a tubing string extending uphole through the casing and forming an annular area therebetween, wherein produced fluid is conducted uphole through the tubing to the surface of the ground and to a storage means, the method of chemically treating the borehole comprising the steps of:

step (1): connecting a mixing tank to receive produced fluid from the tubing; producing fluid from the formation and flowing a relative large stream of the produced fluid to the storage means and a small stream of the produced fluid from the tubing into the mixing tank until a predetermined quantity of fluid is obtained that is of sufficient volume for coating the annular area;

step (2): storing a quantity of treatment chemical in a vessel to provide sufficient treatment chemical for carrying out the remaining steps herein a multiplicity of times;

step (3): connecting a pump means for transferring chemical from the vessel of step (2) into the mixing tank of step (1) and transferring chemical for a first time interval when the pump means is actuated;

step (4): actuating the pump means of step (3) at the end of successive second time intervals until the concentration of the chemical contained within the mixture increases to a predetermined value for treating the borehole at the end of a third time interval; and then, step (5): dumping the contents of the mixing tank into the annulus at the end of said third time interval to thereby coat the annular area with said mixture.

2. The method of claim 1 and including the following additional steps:

step (6): carrying out step (2) by isolating a plurality of different treatment chemicals in a plurality of different vessels;

step (7): connecting said pump means to each of the chemical vessels and transferring part of the contents thereof into said mixing tank during said second time interval; and, step (8): mixing the contents of the mixing tank simultaneously while carrying out step (7).

3. The method of claim 2 and including the following steps:

step (9): exhausting compressible fluid from said mixing tank to thereby fill the mixing tank with produced liquid hydrocarbons; and conducting any exhausted compressible fluid from the mixing tank into the borehole annulus.

4. The method of claim 3 and further including the steps of:

step (10): carrying out step (9) by connecting a spill tank to said mixing tank and flowing liquid from the mixing tank into the spill tank through a pressure relief valve means which is set to open at a pressure less than the pressure measured at the discharge of the chemical pumps to thereby displace any liquid from the mixing tank in order to accommodate the chemical delivered by the chemical pump means.

5. The method of claim 1 and further including the steps of:

step (6): connecting a discharge pump between said mixing tank and the upper end of the annulus, and preventing flow of produced fluid from the tubing string into said mixing tank during the time said discharge pump is dumping the contents of the mixing tank into the wellbore annulus.

6. The method of claim 5 and further including the steps of:

step (7): simultaneously mixing the contents of the mixing tank while adding treatment chemical thereto by simultaneously energizing said mixing pump and chemical pump during each first time interval;

step (8): dumping the contents of the mixing tank into the borehole annulus only after step (7) has been carried out a plurality of times.

7. The method of claim 1 and further including the steps of:

step (6): simultaneously mixing the contents of the mixing tank while adding treatment chemical thereto by simultaneously energizing said mixing pump and chemical pump during each first time interval;

step (7): dumping the contents of the mixing tank into the borehole annulus only after step (6) has been carried out a plurality of times.

8. The method of claim 7 and further including the step of:

step (8): carrying out step (6) by connecting a spill tank to said mixing tank and flowing liquid from the mixing tank into the spill tank through a pressure relief valve means which is set to open at a pressure less than the pressure measured at the discharge of the chemical pumps to thereby displace some liquid from the mixing tank when the mixing tank is full in order to accommodate the chemical delivered by the chemical pump means.

9. The method of claim 8 and further including the following additional steps:

step (9): carrying out step (2) by isolating a plurality of different treatment chemicals in a plurality of different containers;

step (10): connecting a pump means to each of the chemical containers for individually transferring the contents thereof into said mixing tank;

step (11): mixing the contents of the mixing tank simultaneously while carrying out step (4); and, step (12): exhausting compressible fluid from the top of said mixing tank to thereby completely fill the mixing tank with produced liquid hydrocarbons; and conducting the exhausted compressible fluid into the borehole annulus.

10. The method of claim 1 wherein said mixing tank is approximately one barrel in capacity and is released into the borehole annulus in a time interval of about two minutes to flood the annulus with the mixture from the mixing tank, and thereby coat the outer wall of the tubing and the inner wall of the casing.

11. A method of chemically treating a wellbore while producing the wellbore to inhibit the wellbore against corrosion and to enhance production, comprising the steps of:

step (1): flowing produced fluid from the wellbore to a storage means while diverting part of the flow of produced fluid to a mixing chamber;

step (2): fill the mixing chamber with some of the produced fluid that flows from the wellbore;

step (3): adding treatment chemical into the mixing chamber during each of several consecutive time intervals until the concentration of the treatment chemical in the mixing chamber reaches a predetermined concentration;

step (4): dumping the contents of the mixing chamber into the wellbore annulus after a time interval that is equal to the sum of the several time intervals of step (2);

step (5): maintaining the concentration of downhole treatment chemical at a predetermined value to significantly retard downhole corrosion by repeating steps (1)–(3).

12. The method of claim 11 and including the following additional steps:

step (6): carrying out step (3) by isolating a plurality of different treatment chemicals in a plurality of different containers; and, step (7): connecting a pump means to each of the chemical containers for individually transferring the contents thereof into said mixing chamber; and, step (8): mixing the contents of the mixing chamber simultaneously while carrying out step (3).

13. The method of claim 12 and including the following steps:

step (9): exhausting compressible fluid from said mixing chamber to thereby fill the mixing chamber with produced liquid, and conducting the exhausted compressible fluid into the borehole annulus.

14. The method of claim 13 and further including the steps of:

step (10): carrying out step (9) by connecting a spill tank to said mixing chamber and flowing liquid from the mixing chamber into the spill tank through a pressure relief valve means which is set to open at a pressure less than the pressure measured at the discharge of the chemical pumps to thereby displace liquid from the mixing chamber in order to accommodate the chemical delivered by the chemical pump means.

15. The method of claim 14 and further including the steps of:

step (11): preventing flow of produced fluid from the wellbore into said mixing chamber during the time that the contents of the mixing chamber is being dumped into the wellbore annulus.

16. The method of claim 15 and further including the steps of:

step (12): connecting a mixing pump to mix the contents of said mixing chamber and simultaneously mixing the contents of the mixing chamber while adding treatment chemical thereto by simultaneously energizing said mixing pump and chemical pump during each first time interval;

step (13): dumping the contents of the mixing chamber into the borehole annulus only after step (3) has been carried out a plurality of times.

17. The method of claim 11 and further including the steps of:

step (6): connecting a mixing pump to agitate the contents of the mixing chamber; and, simultaneously mixing the contents of the mixing chamber while adding treatment chemical thereto by simultaneously energizing said mixing pump and chemical pump during each first time interval;

step (7): dumping the contents of the mixing tank into the borehole annulus only after step (3) has been carried out a plurality of times.

18. The method of claim 17 and further including the step of:

step (8): carrying out step (3) by connecting a spill tank to said mixing chamber and flowing liquid from the mixing chamber into the spill tank through a pressure relief valve means which is set to open at a pressure less than the pressure measured at the discharge of the chemical pumps to thereby displace liquid from the mixing chamber in order to accommodate the chemical delivered by the chemical pump means.

19. The method of claim 18 and further including the following additional steps:

step (9): carrying out step (3) by isolating a plurality of different treatment chemicals in a plurality of different containers;

step (10): connecting a pump means to each of the chemical containers for individually transferring the contents thereof into said mixing chamber;

step (11): mixing the contents of the mixing chamber simultaneously while carrying out step (3); and, step (12): exhausting compressible fluid from said mixing chamber to thereby fill the mixing chamber with produced liquid hydrocarbons; and conducting the exhausted compressible fluid into the borehole annulus.

20. The method of claim 11 wherein said mixing chamber is approximately one barrel in capacity and is released into the borehole annulus in a time interval of about two minutes to flood the annulus with the mixture from the mixing chamber.

21. In a hydrocarbon producing cased wellbore extending downhole through a hydrocarbon producing formation, a tubing string extending uphole through the casing and forming an annulus therebetween, wherein produced fluid is conducted uphole through the tubing to the surface of the ground and to a storage means, the method of chemically treating the wellbore comprising the steps of:

connecting a mixing tank to receive some of the produced fluid by diverting part of the fluid as it flows from the tubing string towards the storage means;

producing fluid from the formation and flowing a relatively large quantity of fluid to the storage means while diverting a relative small stream of the produced fluid from the tubing string into the mixing tank until a predetermined quantity of well fluid is obtained in said mixing tank that is sufficient for subsequently coating the borehole annulus;

storing a sufficient quantity of treatment chemical in a vessel to provide a source of treatment chemical for treating the wellbore a multiplicity of times;

connecting a pump means for transferring chemical from the vessel to the mixing tank and periodically actuating the pump means for a first time interval;

actuating the pump means at the end of successive time intervals until sufficient chemical is transferred during a multiplicity of said time intervals to progressively raise the concentration of the chemical in the vessel to a predetermined value that is suitable for treating the borehole;

connecting the mixing tank to flow into the upper end of the borehole annulus and periodically dumping the contents of the mixing tank into the borehole annulus only after the desired mixture concentration has been attained.

22. In a cased wellbore that extends downhole through a fluid producing strata, a production tubing string is concentrically arranged respective to the casing and forms an annulus therebetween and extends from proximity of a fluid producing formation uphole to the surface of the ground for producing the wellbore; wherein the produced fluid is conducted from the tubing string, through a tee connection, to a storage facility, the improvement comprising:

a large mixing tank connected to receive liquid from said tee connection whenever fluid is flowing therethrough;

a gas escape valve means connected to exhaust compressible fluid from the upper end of said mixing chamber and thereby enable said mixing chamber to be completely filled with liquid;

a plurality of treatment chemical containers; a chemical pump connected to transfer chemical from each said chemical container into said mixing chamber; timer means by which said pump is energized to run for a first time interval each second time interval;

a mixing pump connected to mix the contents of said mixing tank;

a transfer pump by which the contents of said mixing tank is translocated into the annulus of the wellbore after a third time interval;

whereby; the concentration of treatment chemical in said mixing chamber is progressively increased and then the entire contents of said mixing chamber is dumped into the borehole annulus to wash the surface of the borehole with the contents of the mixing chamber and treat the entire borehole.

* * * * *

UNITED STATES PATENT AND TRADEMARK OFFICE
CERTIFICATE OF CORRECTION

PATENT NO.  : 4,830,112
DATED       : MAY 16, 1989
INVENTOR(S) : DON J. ERICKSON

It is certified that error appears in the above-identified patent and that said Letters Patent is hereby corrected as shown below:

Column 5, line 66, substitute --48'-- for "48";
Column 6, line 1, substitute --48'-- for "48";
          Line 24, insert --S2-- after "main";
          Line 29, insert --valve-- after "outlet";
          Line 30, substitute --reach-- for "reaches";
          Line 52, insert --, 76'-- after "76";
          Line 53, insert --, 76'-- after "76";
          Line 59, insert --, 76'-- after "76";
          Line 62, insert --, 76'-- after "76";

Column 12, line 46, substitute --filling-- for "fill";
           Line 56, substitute --(3)-- for "(2)";
           Line 60, substitute --(4)-- for "(3)".

Signed and Sealed this

Twenty-fourth Day of November, 1992

Attest:

DOUGLAS B. COMER

*Attesting Officer*   *Acting Commissioner of Patents and Trademarks*